United States Patent [19]
Yoshida et al.

[11] Patent Number: 6,083,868
[45] Date of Patent: *Jul. 4, 2000

[54] METHOD OF PRODUCING HEAT-RESISTANT CATALYST SUPPORT

[75] Inventors: Takeru Yoshida, Susono; Mikio Murachi, Toyota; Shinji Tsuji, Okazaki, all of Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/738,500

[22] Filed: Oct. 28, 1996

[30] Foreign Application Priority Data

Oct. 31, 1995 [JP] Japan .................. 7-282996

[51] Int. Cl.⁷ .................................. B01J 21/06
[52] U.S. Cl. .................. 502/304; 502/439; 502/341; 502/346; 502/205; 502/242; 502/243; 502/250
[58] Field of Search .................. 502/439, 304, 502/302, 341, 346, 242, 243, 250, 303; 252/462; 423/239, 239.1

[56] References Cited

U.S. PATENT DOCUMENTS

| | | | |
|---|---|---|---|
| 4,053,556 | 10/1977 | Acres | 423/239.1 |
| 4,220,559 | 9/1980 | Polinski | 502/303 |
| 4,771,028 | 9/1988 | Arai | 502/439 |
| 4,902,664 | 2/1990 | Wan | 502/300 |
| 5,075,276 | 12/1991 | Ozawa et al. . | |
| 5,210,062 | 5/1993 | Narula | 502/304 |
| 5,212,130 | 5/1993 | Addiego | 502/439 |
| 5,294,421 | 3/1994 | Muraki | 423/239.1 |
| 5,389,589 | 2/1995 | Kharas | 423/625 |
| 5,618,772 | 4/1997 | Suda | 502/303 |
| 5,804,152 | 9/1998 | Miyoshi | 423/239.1 |

FOREIGN PATENT DOCUMENTS

| | | |
|---|---|---|
| 0 485 180 | 5/1992 | European Pat. Off. . |
| 0 507 590 | 10/1992 | European Pat. Off. . |
| 0 613 714 | 9/1994 | European Pat. Off. . |
| 0 657 204 | 6/1995 | European Pat. Off. . |
| 0 718 028 | 6/1996 | European Pat. Off. . |
| 3 913 972 | 11/1989 | Germany . |
| 49-007185 | 1/1974 | Japan . |
| 5-168860 | 7/1993 | Japan . |
| 5-317652 | 12/1993 | Japan . |
| 6-31139 | 2/1994 | Japan . |
| 645173 | 3/1995 | Japan . |
| 7-75735 | 3/1995 | Japan . |

*Primary Examiner*—Tom Dunn
*Assistant Examiner*—Peter DiMauro
*Attorney, Agent, or Firm*—Oliff & Berridge, PLC

[57] ABSTRACT

A high heat-resistant catalyst support comprises an amorphous composite oxide which is constituted by:

(i) an NOx storage component comprising an oxide of at least one element selected from the group consisting of alkali metals, alkaline-earth metals and rare-earth elements, (ii) alumina ($Al_2O_3$); and (iii) at least one element selected from the group consisting of titania ($TiO_2$), zirconia ($ZrO_2$) and silica ($SiO_2$).

Furthermore, $TiO_2$, $ZrO_2$ and $SiO_2$ are acidic, and at least one element selected from the group consisting of $TiO_2$, $ZrO_2$ and $SiO_2$ is highly dispersed to form composite. So, SOx having acidity is prevented from approaching the NOx storage component, and sulfur poisoning is prevented. Moreover, bonding force of the NOx storage component to the catalyst support strengthens, and the NOx storage component is prevented from being scattered.

10 Claims, No Drawings

METHOD OF PRODUCING HEAT-RESISTANT CATALYST SUPPORT

BACKGROUND OF THE INVENTION

1. Field of the Invention

This invention relates to a high heat-resistant catalyst support used for a catalyst for purifying automotive exhaust gases, and having excellent heat resistance and excellent sulfur-poisoning resistance.

2. Description of Related Arts

As catalysts for purifying automotive exhaust gases, there have been employed 3-way catalysts so far which oxidize carbon monoxide (CO) and hydrocarbons (HC) and reduce nitrogen oxides (NOx) to purify the exhaust gases. For example, the 3-way catalysts have been known widely which comprise a heat-resistant supporting base material formed of cordierite, a porous catalyst support layer formed of gamma-alumina and disposed on the supporting base material, and a noble metal catalyst ingredient such as platinum (Pt) and rhodium (Rh) loaded on the porous catalyst support layer. Further, the 3-way catalysts are also known in which ceria i.e., cerium oxide having an oxygen storage ability is employed in addition to the above catalyst ingredient in order to improve catalytic activity at low temperatures.

In the meanwhile, carbon dioxide ($CO_2$) in exhaust gases from internal combustion engines of automobiles and the like has become a problem in view of global environmental conservation. Lean burn in oxygen excessive atmosphere is desired as a means of dissolving the problem. The lean burn improves fuel consumption, and as a result the amount of fuel used is decreased and $CO_2$, which is included in combustion exhaust gas, can be suppressed from generating.

In this respect, the conventional 3-way catalysts aim to oxidize CO and HC and reduce NOx simultaneously into innocuous entities when the air-fuel ratio is at the stoichiometric point (or the ideal air-fuel ratio), and cannot exhibit sufficient reduction and removal of NOx in the exhaust gases which contain oxygen in excessive amounts required for oxidizing carbon monoxide and hydrocarbons therein at the time of lean burn. Hence, it has been desired to develop catalysts and exhaust gas purifying systems which are capable of adequately purifying NOx even in oxygen excessive atmospheres.

In view of the aforementioned circumstances, the applicants et al of the present invention have proposed an exhaust gas purifying catalyst in which alkaline-earth metals and platinum (Pt) are loaded on a porous support formed of alumina and the like in Japanese Unexamined Patent Publication (KOKAI) No. 5-317,652, an exhaust gas purifying catalyst in which lanthanum (La) and platinum (Pt) are loaded on a porous support in Japanese Unexamined Patent Publication (KOKAI) No. 5-168,860, and an exhaust gas purifying catalyst in which alkali metals and platinum (Pt) are loaded on an alumina support in Japanese Unexamined Patent Publication (KOKAI) No. 6-31,139. In using these catalysts, NOx are adsorbed on oxides of alkaline-earth metals or lanthanum oxide on the fuel-lean side (i.e., in the oxygen excessive atmospheres), and the adsorbed NOx react with reducing components such as HC and CO at the stoichiometric point or on the fuel-rich side (i.e., in the oxygen-lean atmospheres). So, these catalysts attain excellent NOx purifying performance even on the fuel-lean side.

By the way, the average temperature and the maximum temperature of inlet gases to the bed of catalysts tend to rise more and more in recent years due to severe restrictions on exhaust gases and the improvement in the capacity of engines. Therefore, it is desired to make a further improvement in the heat resistance of catalysts for purifying exhaust gases. Further, with an increase in inlet gas temperatures, it is also desired to improve NOx conversion at elevated temperatures.

In the conventional catalyst, however, there arises a problem that NOx storage components react with catalyst supports at high temperatures and as a result the NOx storage ability of the NOx storage components is deteriorated. Besides, in the conventional catalyst, a temperature range in which the maximum catalyst performance is obtained, namely, a temperature window is narrow, and the NOx conversion is hardly secured at elevated temperatures.

Further, in the conventional catalyst, the NOx storage components are poisoned by SOx which are produced from a very small amount of sulfur contained in fuel, in other words, the NOx storage ability is decreased due to sulfate generation. Consequently, the catalyst are degraded in durability.

Moreover, in the conventional catalyst, the NOx storage components have a poor dispersion. As a result, crystallization of the NOx storage components is promoted at and around a part having a high concentration of the NOx storage components, so that the NOx storage ability is deteriorated. The NOx storage ability, especially at elevated temperatures is greatly influenced by the combination of NOx storage components and catalyst supports, and the dispersibility of NOx storage components. Further, when the NOx storage components are poorly dispersed, sulfate crystals generated by sulfur poisoning easily grow and therefore, become more difficult to be removed, so that the durability of the catalysts is decreased.

It is supposed that the catalyst support comprises composite oxide constituted by NOx storage components and alumina in order that NOx storage components are highly dispersed. In the catalyst using such catalyst support, NOx storage ability is improved at high temperatures. However, there are disadvantages that NOx storage components are gradually scattered by long high-temperature endurance test, and that durability cannot be obtained satisfactorily. Further, when too much amounts of sulfur is contained, the catalyst is degraded by sulfur poisoning, and the performance of the catalyst is deteriorated.

SUMMARY OF THE INVENTION

The present invention has been developed in view of the aforementioned circumstances. It is therefore an object of the present invention to highly disperse an NOx storage component, to prevent the NOx storage component being scattered and to improve sulfur-poisoning resistance.

A high heat-resistant catalyst support according to the present invention, which dissolves the above problems, comprises an amorphous composite oxide which is constituted by:

(i) an NOx storage component comprising an oxide of at least one element selected from the group consisting of alkali metals, alkaline-earth metals and rare-earth elements, (ii) alumina ($Al_2O_3$); and (iii) at least one element selected from the group consisting of titania ($TiO_2$), zirconia ($ZrO_2$) and silica ($SiO_2$).

In the catalyst support according to the present invention, the NOx storage component is highly dispersed to form composite as composite oxide. So, crystallization of the NOx storage component can be prevented at high temperatures, and excellent heat resistance can be obtained Furthermore, $TiO_2$, $ZrO_2$ and $SiO_2$ are acidic, and at least one element selected from the group consisting of $TiO_2$, $ZrO_2$ and $SiO_2$ is highly dispersed to form composite. So, SOx having acidity is prevented from approaching the NOx storage component, and sulfur poisoning is prevented.

Further, since at least one element selected from the group consisting of $TiO_2$, $ZrO_2$ and $SiO_2$ is highly dispersed to form composite, bonding force of the NOx storage component to the catalyst support strengthens, and the NOx storage component is prevented from being scattered at high temperatures. Moreover, such oxides are highly dispersed to form composite so that heat resistance is improved as compared with the case in which oxide are mixed in powdery condition.

At least one element selected from the group consisting of alkali metals, alkaline-earth metals and rare-earth elements is used as the NOx storage component. Alkali metals contain lithium, sodium, potassium, rubidium, cesium and francium. Alkaline-earth metals are the group IIa in the periodic table, and they contain barium, beryllium, magnesium, calcium and strontium. Rare-earth elements contain scandium, yttrium, lanthanum, cerium, praseodymium and neodymium.

The molar ratio of (i) NOx storage component, (ii) alumina and (iii) at least one element selected from the group consisting of $TiO_2$, $ZrO_2$ and $SiO_2$ is respectively determined in view of NOx storage ability, sulfur-poisoning resistance and heat resistance. It is preferable that the molar ratio of (i):(ii):(iii) is 1:(4–12):(0.01–5).

When the molar ratio of alumina to the NOx storage component is less than 4, NOx storage ability is full, and simultaneously, heat resistance and three-way catalytic activity are deteriorated. When the molar ratio of alumina to the NOx storage component is more than 12, NOx storage ability is deteriorated, and NOx purifying performance is degraded.

When the molar ratio of at least one element selected from the group consisting of $TiO_2$, $ZrO_2$ and $SiO_2$ to the NOx storage component is less than 0.01, sulfur-poisoning resistance and heat resistance are deteriorated. When the molar ratio of at least one element selected from the group consisting of $TiO_2$, $ZrO_2$ and $SiO_2$ to the NOx storage component is more than 5, specific surface area is decreased by relatively decreasing the amount of alumina. As a result, three-way catalytic activity and heat resistance are deteriorated.

The catalyst support according to the present invention preferably contains (iv) ceria ($CeO_2$) as the fourth component. Since $CeO_2$ has oxygen adsorbing and releasing ability, three-way catalytic activity is improved. Further, ceria itself has excellent heat resistance so that heat resistance of the catalyst support is improved.

$CeO_2$ may form composite oxide with other components, or it may exist as single oxide. It is preferable that $CeO_2$ forms composite oxide because it is highly dispersed, and heat resistance is remarkably improved. When the catalyst support contains $CeO_2$ as composite oxide, it is preferable that the molar ratio of (i):(ii):(iii):(iv) is 1:(4–12):(0.01–5): (0.5–3). When the molar ratio of $CeO_2$ to the NOx storage component is less than 0.5, or when the molar ratio of $CeO_2$ to the NOx storage component is more than 3, heat resistance is deteriorated.

It is preferable that elements of group IVa in the periodic table are dissolved into $CeO_2$. It is more preferable that $CeO_2$ is stabilized by dissolution of zirconium. The dissolving amount of such elements is preferably not more than 50 mol %. When the dissolving amount of such elements is more than 50mol %, oxygen adsorbing ability of $CeO_2$ is deteriorated.

In order to produce the catalyst support according to the present invention, (i) a solution of a chemical compound of NOx storage component, (ii) a dispersion of alumina sol and (iii) a dispersion of oxide sol of at least one oxide selected from the group consisting of $TiO_2$, $ZrO_2$ and $SiO_2$ are mixed to prepare a mixed sol dispersion. Then, the mixed sol dispersion is formed into gel, and the gel is dried and calcined. Alumina sol and oxide sol of at least one metal respectively comprise very fine particle having a specific surface area of 500 $m_2/g$ or more. Since the NOx storage component is dispersed on the surface of the very fine particle, the NOx storage component is very highly dispersed. Further, crystallizing temperature is very high so that high heat resistance can be maintained satisfactorily.

The mixing molar ratio of the chemical compound of the NOx storage component to oxide sol (NOx storage component/oxide sol) lies in the range from 1/2 to 1/100, and preferably in the range from 1/3 to 1/12, when the chemical compound is converted into oxide. When the mixing molar ratio of the chemical compound is more than 1/2, the heat resistance is decreased due to a decrease in dispersibility of the NOx storage component. When the mixing molar ratio of the chemical compound is less than 1/100, the NOx storage ability is deteriorated, and the NOx purifying performance is degraded, although the heat resistance is not lowered.

Examples of the above chemical compound are hydroxide, chloride, nitrate, and acetate, and aqueous solutions of these chemical compounds can be used.

As a method of mixing the oxide sol of at least one metal with the solution of the chemical compound, any known mixing method can be used such as ultrasonic wave radiation, an ultrasonic homogenizer, stirring, and a ball mill.

It must be noted that the NOx storage component can be dispersed highly as in the above method, by supplying not less than one of the metal oxide, the NOx storage component and aluminum in the forms of metal alkoxide and conducting a sol-gel method. In the sol-gel method, however, the costs of raw materials are quite high. The above method achieves production at a cost of 1/30 or less based on the sol-gel method.

The catalyst support of the present invention can be used as the catalyst for purifying exhaust gases when a noble metal such as Pt, Pd or Rh is loaded on the catalyst support. As conventional, a water adsorption loading method or an impregnated loading method can be utilized for loading the noble metal. However, when the catalyst support of the present invention is impregnated into a solution of a chemical compound of the noble metal, the NOx storage component may be dissolved, and the loading amount of the NOx storage component decreases. As a result, the dissolved NOx storage component is aggregated on the surface of the catalyst support, and the aggregated NOx storage component reacts with the catalyst support to cause deterioration of heat resistance.

As a result, it is preferable that the noble metal is previously loaded on (1) alumina, (2) at least one element selected from the group consisting of $TiO_2$, $ZrO_2$ and $SiO_2$ or (3) $CeO_2$, and that the obtained material is mixed with a powder of the catalyst support which is separately formed in the present invention to prepare the catalyst.

PREFERRED EMBODIMENTS OF THE PRESENT INVENTION

The exact nature of this invention, as well as other objects and advantages thereof, will be readily apparent from consideration of the description of preferred embodiments of the present invention.

EXAMPLE 1

9.8 g of potassium acetate, 61.2 g of aluminum triisopropoxide and 14.2 g of titanium tetraisopropoxide were dissolved in 345 ml of 2-propanol. After stirred with a reflux at 80° C. for two hours, this solution was mixed with 18.0 g of 2,4-pentanedione, and further stirred for three hours. Then, while the solution was held at 80° C., a mixed solution of 39.6 ml of ion exchange water and 40 ml of 2-propanol was dropped into the solution. After stirred at 80° C. for five hours, the resulting solution was vacuum dried to obtain white powder.

This powder was air calcined at 800° C. for five hours, thereby preparing a catalyst support of Example 1. This catalyst support had a specific surface area of 125 $m^2/g$. An X-ray diffraction analysis revealed that potassium, titanium and aluminum constituted an amorphous composite oxide, and that pottasium and titanium were highly dispersed in aluminum. As shown in Table 2, a molar ratio of $K_2O:Al_2O_3:TiO_2$ was 1:3:1.

The obtained catalyst support powder was mixed at the ratio of 10 g of the catalyst support powder to 100 ml of a solution of platinum dinitrodiammine nitrate in 2-propanol containing platinum in an amount of 0.008 mol, and stirred at room temperature for one hour. Then, powder was separated by centrifugation, dried at 120° C. for one hour, thereby loading platinum to obtain a catalyst powder. The loading amount of platinum was 1.5% by weight.

The obtained catalyst powder was pelletized to prepare a pellet catalyst. Then, an endurance test (A) and an endurance test (B) were respectively performed on the catalyst powder. In the endurance test (A), a fuel-rich model gas having A/F(air fuel ratio)=14 was supplied for 4 minutes, and then, a fuel-lean model gas having A/F=21 was supplied for 1 minute, and this cycle was repeated at an inlet gas temperature of 850° C. for 50 hours. In the endurance test (B), the same cycle as that of the endurance test (A) was repeated at an inlet gas temperature of 400° C. for 5 hours. After that, the fuel-rich model gas and the fuel-lean model gas (shown in Table 1) were alternatively supplied at a space velocity of 100,000/h for 1 minute respectively. Thus, an average NOx purification at a temperature of 350° C. and a temperature for purifying 50% of HC were measured. The result was shown in Table 3.

EXAMPLE 2

A catalyst support of Example 2 was prepared in the same way as that of Example 1, except that a molar ratio of $K_2O:Al_2O_3:TiO_2$ was 1:4:1. A catalyst was prepared and tested in the same manner as that of Example 1. The result was shown in Table 3.

EXAMPLE 3

A catalyst support of Example 3 was prepared in the same way as that of Example 1, except that a molar ratio of $K_2O:Al_2O_3:TiO_2$ was 1:6:1. A catalyst was prepared and tested in the same manner as that of Example 1. The result was shown in Table 3.

EXAMPLE 4

A catalyst support of Example 4 was prepared in the same way as that of Example 1, except that a molar ratio of $K_2O:Al_2O_3:TiO_2$ was 1:12:1. A catalyst was prepared and tested in the same manner as that of Example 1. The result was shown in Table 3.

EXAMPLE 5

A catalyst support of Example 5 was prepared in the same way as that of Example 1, except that a molar ratio of $K_2O:Al_2O_3:TiO_2$ was 1:13:1. A catalyst was prepared and tested in the same manner as that of Example 1. The result was shown in Table 3.

EXAMPLE 6

A catalyst support of Example 6 was prepared in the same way as that of Example 1, except that tetraethoxysilicon was used instead of titanium tetraisopropoxide, and that a molar ratio of $K_2O:Al_2O_3:SiO_2$ was 1:6:0.005. A catalyst was prepared and tested in the same manner as that of Example 1. The result was shown in Table 3.

EXAMPLE 7

A catalyst support of Example 7 was prepared in the same way as that of Example 1, except that tetraethoxysilicon was used instead of titanium tetraisopropoxide, and that a molar ratio of $K_2O:Al_2O_3:SiO_2$ was 1:6:0.01. A catalyst was prepared and tested in the same manner as that of Example 1. The result was shown in Table 3.

EXAMPLE 8

A catalyst support of Example 8 was prepared in the same way as that of Example 1, except that tetraethoxysilicon was used instead of titanium tetraisopropoxide, and that a molar ratio of $K_2O:Al_2O_3:SiO_2$ was 1:6:0.3. A catalyst was prepared and tested in the same manner as that of Example 1. The result was shown in Table 3.

EXAMPLE 9

A catalyst support of Example 9 was prepared in the same way as that of Example 1, except that a molar ratio of $K_2O:Al_2O_3:TiO_2$ was 1:6:2. A catalyst was prepared and tested in the same manner as that of Example 1. The result was shown in Table 3.

EXAMPLE 10

A catalyst support of Example 10 was prepared in the same way as that of Example 1, except that a molar ratio of $K_2O:Al_2O_3:TiO_2$ was 1:6:5. A catalyst was prepared and tested in the same manner as that of Example 1. The result was shown in Table 3.

EXAMPLE 11

A catalyst support of Example 11 was prepared in the same way as that of Example 1, except that a molar ratio of $K_2O:Al_2O_3:TiO_2$ was 1:6:6. A catalyst was prepared and tested in the same manner as that of Example 1. The result was shown in Table 3.

EXAMPLE 12

A catalyst support of Example 12 was prepared in the same way as that of Example 1, except that zirconium tetrabutoxide was used instead of titanium tetraisopropoxide, and that a molar ratio of $K_2O:Al_2O_3:ZrO_2$ was 1:6:3. A catalyst was prepared and tested in the same manner as that of Example 1. The result was shown in Table 3.

EXAMPLE 13

Platinum was loaded on an aluminum powder in the same manner as that of the Example 1. The loading amount of platinum was 6.2% by weight. The aluminum powder on which platinum was loaded was mixed with the same catalyst support powder as that of the Example 2 in which a molar ratio of $K_2O:Al_2O_3:TiO_2$ was 1:4:1. A weight ratio of the aluminum powder to the catalyst support powder was 1:3. The mixed powder was pelletized to prepare a pellet catalyst. The catalyst was tested in the same manner as that of Example 1. The result was shown in Table 3.

EXAMPLE 14

Platinum was loaded on the same catalyst support powder as that of the Example 2 in which a molar ratio of $K_2O:Al_2O_3:TiO_2$ was 1:4:1. The loading amount of platinum was 1.5% by weight. The obtained catalyst powder was mixed with an aluminum powder. A weight ratio of the aluminum powder to the catalyst support was 1:3. The mixed powder was pelletized to prepare a pellet catalyst. The catalyst was tested in the same manner as that of Example 1. The result was shown in Table 3.

EXAMPLE 15

An aluminum powder was mixed with the same catalyst support powder as that of the Example 2 in which a molar ratio of $K_2O:Al_2O_3:TiO_2$ was 1:4:1. A weight ratio of the aluminum powder to the catalyst support powder was 1:3. Platinum was loaded on the mixed powder in the same manner as that of the Example 1. The loading amount of platinum was 1.5% by weight. The mixed powder on which platinum was loaded was pelletized to prepare a pellet catalyst. The catalyst was tested in the same manner as that of Example 1. The result was shown in Table 3.

EXAMPLE 16

A catalyst support of Example 16 was prepared in the same way as that of Example 1, except that cerium nitrate was added, and that a molar ratio of $K_2O:Al_2O_3:TiO_2:CeO_2$ was 1:3:1:1. A catalyst was prepared and tested in the same manner as that of Example 1. The result was shown in Table 3.

EXAMPLE 17

A catalyst support of Example 17 was prepared in the same way as that of Example 1, except that cerium nitrate was added, and that a molar ratio of $K_2O:Al_2O_3:TiO_2:CeO_2$ was 1:4:1:1. A catalyst was prepared and tested in the same manner as that of Example 1. The result was shown in Table 3.

EXAMPLE 18

A catalyst support of Example 18 was prepared in the same way as that of Example 1, except that cerium nitrate was added, and that a molar ratio of $K_2O:Al_2O_3:TiO_2:CeO_2$ was 1:6:1:1. A catalyst was prepared and tested in the same manner as that of Example 1. The result was shown in Table 3.

EXAMPLE 19

A catalyst support of Example 19 was prepared in the same way as that of Example 1, except that cerium nitrate was added in the solution, and that a molar ratio of $K_2O:Al_2O_3:TiO_2:CeO_2$ was 1:12:1:1. A catalyst was prepared and tested in the same manner as that of Example 1. The result was shown in Table 3.

EXAMPLE 20

A catalyst support of Example 20 was prepared in the same way as that of Example 1, except that cerium nitrate was added, and that a molar ratio of $K_2O:Al_2O_3:TiO_2:CeO_2$ was 1:13:1:1. A catalyst was prepared and tested in the same manner as that of Example 1. The result was shown in Table 3.

EXAMPLE 21

A catalyst support of Example 21 was prepared in the same way as that of Example 1, except that tetraethoxysilicon was used instead of titanium tetraisopropoxide, and that cerium nitrate was added, and that a molar ratio of $K_2O:Al_2O_3:SiO_2:CeO_2$ was 1:6:0.005:1. A catalyst was prepared and tested in the same manner as that of Example 1. The result was shown in Table 3.

EXAMPLE 22

A catalyst support of Example 22 was prepared in the same way as that of Example 1, except that tetraethoxysilicon was used instead of titanium tetraisopropoxide, and that cerium nitrate was added, and that a molar ratio of $K_2O:Al_2O_3:SiO_2:CeO_2$ was 1:6:0.01:1. A catalyst was prepared and tested in the same manner as that of Example 1. The result was shown in Table 3.

EXAMPLE 23

A catalyst support of Example 23 was prepared in the same way as that of Example 1, except that tetraethoxysilicon was used instead of titanium tetraisopropoxide, and that cerium nitrate was added, and that a molar ratio of $K_2O:Al_2O_3:SiO_2:CeO_2$ was 1:6:0.3:1. A catalyst was prepared and tested in the same manner as that of Example 1. The result was shown in Table 3.

EXAMPLE 24

A catalyst support of Example 24 was prepared in the same way as that of Example 1, except that cerium nitrate was added, and that a molar ratio of $K_2O:Al_2O_3:TiO_2:CeO_2$ was 1:6:2:1. A catalyst was prepared and tested in the same manner as that of Example 1. The result was shown in Table 3.

EXAMPLE 25

A catalyst support of Example 25 was prepared in the same way as that of Example 1, except that cerium nitrate was added, and that a molar ratio of $K_2O:Al_2O_3:TiO_2:CeO_2$ was 1:6:5:1. A catalyst was prepared and tested in the same manner as that of Example 1. The result was shown in Table 3.

EXAMPLE 26

A catalyst support of Example 26 was prepared in the same way as that of Example 1, except that cerium nitrate was added, and that a molar ratio of $K_2O:Al_2O_3:TiO_2:CeO_2$ was 1:6:6:1. A catalyst was prepared and tested in the same manner as that of Example 1. The result was shown in Table 3.

EXAMPLE 27

A catalyst support of Example 27 was prepared in the same way as that of Example 1, except that zirconiumtetrabutoxide was used instead of titanium tetraisopropoxide, and that cerium nitrate was added, and that a molar ratio of $K_2O:Al_2O_3:ZrO_2:CeO_2$ was 1:6:3:1. A catalyst was prepared and tested in the same manner as that of Example 1. The result was shown in Table 3.

EXAMPLE 28

A catalyst support of Example 28 was prepared in the same way as that of Example 1, except that cerium nitrate was added, and that a molar ratio of $K_2O:Al_2O_3:TiO_2:CeO_2$ was 1:6:1:0.4. A catalyst was prepared and tested in the same manner as that of Example 1. The result was shown in Table 3.

EXAMPLE 29

A catalyst support of Example 29 was prepared in the same way as that of Example 1, except that cerium nitrate was added, and that a molar ratio of $K_2O:Al_2O_3:TiO_2:CeO_2$ was 1:6:1:0.5. A catalyst was prepared and tested in the same manner as that of Example 1. The result was shown in Table 3.

EXAMPLE 30

A catalyst support of Example 30 was prepared in the same way as that of Example 1, except that cerium nitrate was added, and that a molar ratio of $K_2O:Al_2O_3:TiO_2:CeO_2$ was 1:6:1:2. A catalyst was prepared and tested in the same manner as that of Example 1. The result was shown in Table 3.

EXAMPLE 31

A catalyst support of Example 31 was prepared in the same way as that of Example 1, except that cerium nitrate was added, and that a molar ratio of $K_2O:Al_2O_3:TiO_2:CeO_2$ was 1:6:1:3. A catalyst was prepared and tested in the same manner as that of Example 1. The result was shown in Table 3.

EXAMPLE 32

A catalyst support of Example 32 was prepared in the same way as that of Example 1, except that cerium nitrate was added, and that a molar ratio of $K_2O:Al_2O_3:TiO_2:CeO_2$ was 1:6:1:4. A catalyst was prepared and tested in the same manner as that of Example 1. The result was shown in Table 3.

EXAMPLE 33

Platinum was loaded on a powder of $CeO_2$ in the same manner as that of the Example 1. The loading amount of platinum was 6.2% by weight. The powder of $CeO_2$ on which platinum was loaded was mixed with the same catalyst support powder as that of the Example 1 except that a molar ratio of $K_2O:Al_2O_3:TiO_2$ was 1:6:1. A weight ratio of the powder of $CeO_2$ to the catalyst support powder was 1:3. The mixed powder was pelletized to prepare a pellet catalyst. The catalyst was tested in the same manner as that of Example 1. The result was shown in Table 3.

EXAMPLE 34

A powder of $CeO_2$ was mixed with the same catalyst support powder as that of the Example 1 except that a molar ratio of $K_2O:Al_2O_3:TiO_2$ was 1:6:1. A weight ratio of the ceria powder to the catalyst support powder was 1:3. Platinum was loaded on the mixed powder in the same manner as that of the Example 1. The loading amount of platinum was 1.5% by weight. The mixed powder on which platinum was loaded was pelletized to prepare a pellet catalyst. The catalyst was tested in the same manner as that of Example 1. The result was shown in Table 3.

COMPARATIVE EXAMPLE 1

A catalyst support of Comparative Example 1 was prepared in the same way as that of Example 1, except that titanium tetraisopropoxide was not used, and that a molar ratio of $K_2O:Al_2O_3$ was 1:3. A catalyst was prepared and tested in the same manner as that of Example 1. The result was shown in Table 3.

COMPARATIVE EXAMPLE 2

A catalyst support of Comparative Example 2 was prepared in the same way as that of Example 1, except that titanium tetraisopropoxide was not used, and that a molar ratio of $K_2O:Al_2O_3$ was 1:6. A catalyst was prepared and tested in the same manner as that of Example 1. The result was shown in Table 3.

COMPARATIVE EXAMPLE 3

A catalyst support of Comparative Example 3 was prepared in the same way as that of Example 1, except that titanium tetraisopropoxide was not used, and that cerium nitrate was added in the solution, and that a molar ratio of $K_2O:Al_2O_3:CeO_2$ was 1:6:1. A catalyst was prepared and tested in the same manner as that of Example 1. The result was shown in Table 3.

COMPARATIVE EXAMPLE 4

A catalyst support of Comparative Example 4 was prepared in the same way as that of Example 1, except that titanium tetraisopropoxide was not used, and that a molar ratio of $K_2O:Al_2O_3$ was 1:6.

Then, a powder of the above composite oxide was mixed with a powder of $TiO_2$. A molar ratio of $K_2O:TiO_2$ was 1:1. A catalyst was prepared and tested in the same manner as that of Example 1. The result was shown in Table 3.

COMPARATIVE EXAMPLE 5

A catalyst support of Comparative Example 5 was prepared in the same way as that of Example 1, except that barium acetate was used instead of potassium acetate, and that titanium tetraisopropoxide was not used, and that a molar ratio of $BaO:Al_2O_3$ was 1:3. A catalyst was prepared and tested in the same manner as that of Example 1. The result was shown in Table 3.

COMPARATIVE EXAMPLE 6

A catalyst support of Comparative Example 6 was prepared in the same way as that of Example 1, except that cesium acetate was used instead of potassium acetate, and that titanium tetraisopropoxide was not used, and that a molar ratio of $Cs_2O:Al_2O_3$ was 1:6. A catalyst was prepared and tested in the same manner as that of Example 1. The result was shown in Table 3.

EVALUATION

As seen from the comparison of the catalyst support of Example 1 and the catalyst support of Comparative Example 1, the catalyst support of Example 1 showed higher NOx purification after the endurance test (A), and it exhibited more excellent heat resistance and sulfur-poisoning resistance. This was apparently caused by the fact that $TiO_2$ contained in the catalyst support of Example 1 formed composite, which was proved by the comparison of the catalyst support of Example 3 and the catalyst support of Comparative Example 2. As seen from the comparison of the catalyst support of Example 3 and the catalyst support of Comparative Example 4, only little effect was obtained when $TiO_2$ powder was mixed as single oxide, but an excellent effect was obtained when $TiO_2$ formed composite oxide with other components.

As seen from the comparison of catalyst supports of Examples 1–5 and catalyst supports of Examples 16–20, heat resistance was remarkably improved when $CeO_2$ formed composite, and NOx purifying performance after the endurance test was remarkably improved.

As seen from the comparison of each catalyst support of Examples 1–5 and 16–20, it was preferable that a molar ratio of $K_2O:Al_2O_3$ was 1:(4–12) in the catalyst support comprising composite oxide. Further, as seen from the comparison of each catalyst support of Examples 6–11 and 21–26, it was preferable that a molar ratio of $K_2O:Ti_2O$ was 1:(0.01–5) in the catalyst support comprising composite oxide. Moreover, as seen from the comparison of each catalyst support of Examples 28–32, it was preferable that a molar ratio of $K_2O:CeO_2$ was 1:(0.5–3) in the catalyst support comprising composite oxide when $CeO_2$ formed composite.

As seen from the comparison of the catalyst support of Example 13 and the catalyst support of Example 2, the catalyst support of Example 13 showed higher NOx purification. So, it was apparently preferable that platinum was loaded on single oxide, and then, it was mixed with the catalyst support. Further, the loading amount of platinum was 1.5% by weight in the Example 13, which was the same amount as that of other Examples.

In the present invention, potassium was used as NOx storage components. However, when other alkali metals, alkaline-earth metals and rare-earth elements are used as NOx storage components, the same effects can be obtained.

The high heat-resistant catalyst support according to the present invention has excellent heat resistance, and it prevents sulfur poisoning of the NOx storage components. So, when the catalyst support is used as a catalyst for purifying exhaust gases, it is possible to exhibit remarkable endurance, and to maintain high NOx purification during long-time of period.

TABLE 1

| | A/F | CO % | $C_3H_6$ ppm | $CO_2$ % | $O_2$ % | $H_2O$ % | NO ppm | $SO_2$ ppm | $N_2$ |
|---|---|---|---|---|---|---|---|---|---|
| FUEL-RICH | 14 | 0.6 | 700 | 10.0 | 0.4 | 10.0 | 500 | 50 | BALANCE |
| FUEL-LEAN | 21 | 0.1 | 700 | 10.0 | 6.5 | 10.0 | 500 | 50 | BALANCE |

TABLE 2

| | | COMPOSITE OXIDE (MOLAR RATIO) | | | | | | | | Pt | COMPOSITE OXIDE (MOLAR RATIO) | | | Pt |
|---|---|---|---|---|---|---|---|---|---|---|---|---|---|---|
| | | $K_2O$ | BaO | $Cs_2O$ | $Al_2O_3$ | $TiO_2$ | $SiO_2$ | $ZrO_2$ | $CeO_2$ | wt % | $Al_2O_3$ | $CeO_2$ | $TiO_2$ | wt % |
| EXAMPLE | 1 | 1 | — | — | 3 | 1 | — | — | — | 1.5 | — | — | — | — |
| | 2 | 1 | — | — | 4 | 1 | — | — | — | 1.5 | — | — | — | — |
| | 3 | 1 | — | — | 6 | 1 | — | — | — | 1.5 | — | — | — | — |
| | 4 | 1 | — | — | 12 | 1 | — | — | — | 1.5 | — | — | — | — |
| | 5 | 1 | — | — | 13 | 1 | — | — | — | 1.5 | — | — | — | — |
| | 6 | 1 | — | — | 6 | — | 0.005 | — | — | 1.5 | — | — | — | — |
| | 7 | 1 | — | — | 6 | — | 0.01 | — | — | 1.5 | — | — | — | — |
| | 8 | 1 | — | — | 6 | — | 0.3 | — | — | 1.5 | — | — | — | — |
| | 9 | 1 | — | — | 6 | 2 | — | — | — | 1.5 | — | — | — | — |
| | 10 | 1 | — | — | 6 | 5 | — | — | — | 1.5 | — | — | — | — |
| | 11 | 1 | — | — | 6 | 6 | — | — | — | 1.5 | — | — | — | — |
| | 12 | 1 | — | — | 6 | — | — | 3 | — | 1.5 | — | — | — | — |
| | 13 | 1 | — | — | 4 | 1 | — | — | — | — | 2 | — | — | 6.2 |
| | 14 | 1 | — | — | 4 | 1 | — | — | — | 1.5 | 2 | — | — | — |
| | 15 | 1 | — | — | 4 | 1 | — | — | — | 1.5 | 2 | — | — | 1. |
| | 16 | 1 | — | — | 3 | 1 | — | — | 1 | 1.5 | — | — | — | — |
| | 17 | 1 | — | — | 4 | 1 | — | — | 1 | 1.5 | — | — | — | — |
| | 18 | 1 | — | — | 6 | 1 | — | — | 1 | 1.5 | — | — | — | — |
| | 19 | 1 | — | — | 12 | 1 | — | — | 1 | 1.5 | — | — | — | — |
| | 20 | 1 | — | — | 13 | 1 | — | — | 1 | 1.5 | — | — | — | — |
| | 21 | 1 | — | — | 6 | — | 0.005 | — | 1 | 1.5 | — | — | — | — |
| | 22 | 1 | — | — | 6 | — | 0.01 | — | 1 | 1.5 | — | — | — | — |
| | 23 | 1 | — | — | 6 | — | 0.3 | — | 1 | 1.5 | — | — | — | — |
| | 24 | 1 | — | — | 6 | 2 | — | — | 1 | 1.5 | — | — | — | — |
| | 25 | 1 | — | — | 6 | 5 | — | — | 1 | 1.5 | — | — | — | — |
| | 26 | 1 | — | — | 6 | 6 | — | — | 1 | 1.5 | — | — | — | — |
| | 27 | 1 | — | — | 6 | — | — | 3 | 1 | 1.5 | — | — | — | — |
| | 28 | 1 | — | — | 6 | 1 | — | — | 0.4 | — | — | — | — | — |
| | 29 | 1 | — | — | 6 | 1 | — | — | 0.5 | 1.5 | — | — | — | — |
| | 30 | 1 | — | — | 6 | 1 | — | — | 2 | 1.5 | — | — | — | — |
| | 31 | 1 | — | — | 6 | 1 | — | — | 3 | 1.5 | — | — | — | — |
| | 32 | 1 | — | — | 6 | 1 | — | — | 4 | 1.5 | — | — | — | — |
| | 33 | 1 | — | — | 6 | 1 | — | — | — | — | — | 1 | — | 6.2 |
| | 34 | 1 | — | — | 6 | 1 | — | — | — | 1.5 | — | 1 | — | 1.5 |
| COMPARATIVE EXAMPLE | 1 | 1 | — | — | 3 | — | — | — | — | 1.5 | — | — | — | — |
| | 2 | 1 | — | — | 6 | — | — | — | — | 1.5 | — | — | — | — |
| | 3 | 1 | — | — | 6 | — | — | — | 1 | 1.5 | — | — | — | — |

TABLE 2-continued

| | | COMPOSITE OXIDE (MOLAR RATIO) | | | | | | | Pt | COMPOSITE OXIDE (MOLAR RATIO) | | | Pt |
|---|---|---|---|---|---|---|---|---|---|---|---|---|---|
| | $K_2O$ | BaO | $Cs_2O$ | $Al_2O_3$ | $TiO_2$ | $SiO_2$ | $ZrO_2$ | $CeO_2$ | wt % | $Al_2O_3$ | $CeO_2$ | $TiO_2$ | wt % |
| 4 | 1 | — | — | 6 | — | — | — | — | 1.5 | — | — | 1 | — |
| 5 | — | 1 | — | 3 | — | — | — | — | 1.5 | — | — | — | — |
| 6 | — | — | 1 | 6 | — | — | — | — | 1.5 | — | — | — | — |

TABLE 3

| | | ENDURANCE TEST (A) 850° C. × 50 Hr | | ENDURANCE TEST (B) 400° C. × 5 Hr | |
|---|---|---|---|---|---|
| | | NO. PURIFICATION (%) | TEMPERATURE FOR PURIFYING 50% of HC (° C.) | NO. PURIFICATION (%) | TEMPERATURE FOR PURIFYING 50% OF HC (° C.) |
| EXAMPLE | 1 | 37 | 440 | 39 | 245 |
| | 2 | 75 | 415 | 74 | 240 |
| | 3 | 78 | 420 | 86 | 242 |
| | 4 | 75 | 418 | 80 | 240 |
| | 5 | 39 | 435 | 37 | 238 |
| | 6 | 69 | 421 | 35 | 236 |
| | 7 | 76 | 419 | 77 | 239 |
| | 8 | 75 | 420 | 83 | 237 |
| | 9 | 77 | 425 | 88 | 240 |
| | 10 | 74 | 424 | 80 | 246 |
| | 11 | 41 | 436 | 47 | 261 |
| | 12 | 72 | 419 | 75 | 241 |
| | 13 | 83 | 391 | 80 | 229 |
| | 14 | 82 | 397 | 84 | 230 |
| | 15 | 90 | 392 | 85 | 229 |
| | 16 | 40 | 402 | 34 | 240 |
| | 17 | 82 | 376 | 83 | 241 |
| | 18 | 84 | 379 | 85 | 241 |
| | 19 | 81 | 377 | 81 | 240 |
| | 20 | 39 | 381 | 32 | 239 |
| | 21 | 59 | 382 | 29 | 239 |
| | 22 | 82 | 378 | 77 | 240 |
| | 23 | 79 | 379 | 81 | 238 |
| | 24 | 81 | 378 | 86 | 239 |
| | 25 | 78 | 376 | 81 | 246 |
| | 26 | 38 | 382 | 49 | 259 |
| | 27 | 77 | 377 | 76 | 242 |
| | 28 | 47 | 402 | 63 | 245 |
| | 29 | 79 | 382 | 84 | 233 |
| | 30 | 80 | 372 | 83 | 230 |
| | 31 | 80 | 371 | 83 | 229 |
| | 32 | 42 | 411 | 61 | 235 |
| | 33 | 88 | 373 | 84 | 227 |
| | 34 | 92 | 371 | 85 | 229 |
| COMPARATIVE EXAMPLE | 1 | 21 | 453 | 20 | 239 |
| | 2 | 69 | 431 | 62 | 235 |
| | 3 | 78 | 380 | 61 | 234 |
| | 4 | 32 | 435 | 62 | 237 |
| | 5 | 49 | 426 | 38 | 230 |
| | 6 | 51 | 441 | 42 | 236 |

What is claimed is:

1. A method for producing a heat-resistant catalyst support as an amorphous composite oxide support, comprising the steps of:
   a) mixing (i) a solution of a compound of an $NO_x$ storage component comprising an oxide of at least one element selected from the group consisting of alkali metals and alkaline-earth metals, (ii) a dispersion of alumina sol, and (iii) a dispersion of oxide sol of at least one oxide selected from the group consisting of $TiO_2$, $ZrO_2$, and $SiO_2$, so as to prepare a mixed sol dispersion;
   b) forming said mixed sol dispersion into a gel; and
   c) drying and calcining said gel,
   wherein a molar ratio of (i):(ii):(iii) is about 1:4–12:0.01–5.

2. A method for producing a heat-resistant catalyst support according to claim 1, wherein said mixed sol dispersion further comprises (iv) a solution of a compound containing cerium, a solution of ceria sol, or mixtures thereof.

3. A method for producing a heat-resistant catalyst support according to claim 2, wherein a molar ratio of (i):(ii):(iii):(iv) is about 1:4–12:0.01–5:0.5–3.

4. A method for producing a heat-resistant catalyst support according to claim 1, wherein a mixing molar ratio of (i) to (iii) is in the range of from about 1/2 to about 1/100.

5. A method for producing a heat-resistant catalyst support according to claim 1, wherein a mixing molar ratio of (i) to (iii) is in the range of from about 1/3 to about 1/12.

6. A method for producing a heat-resistant catalyst support as an amorphous composite oxide support, comprising the steps of:

a) preparing a solution comprising the components (i) an $NO_x$ storage component comprising an oxide of at least one element selected from the group consisting of alkali metals and alkaline-earth metals, (ii) aluminum, and (iii) an element selected from the group consisting of Ti, Zr and Si, wherein at least one of the components (i), (ii) and (iii) is an alkoxide;

b) hydrolyzing said at least one alkoxide; and c) drying and calcining said at least one alkoxide, wherein a molar ratio of (i):(ii):(iii) is about 1:4–12:0.01–5.

7. A method for producing a heat-resistant catalyst support according to claim 6, wherein said solution further comprises (iv) a solution of a compound containing cerium, cerium alkoxide, or mixtures thereof.

8. A method for producing a heat-resistant catalyst support according to claim 7, wherein a molar ratio of (i):(ii):(iii):(iv) is about 1:4–12:0.01–5:0.5–3.

9. A method for producing a heat-resistant catalyst support according to claim 6, wherein a mixing molar ratio of (i) to (iii) is in the range of from about 1/2 to about 1/100.

10. A method for producing a heat-resistant catalyst support according to claim 6, wherein a mixing molar ratio of (i) to (iii) is in the range of from about 1/3 to about 1/12.

* * * * *